United States Patent [19]

Wilt et al.

[11] Patent Number: 5,468,802
[45] Date of Patent: Nov. 21, 1995

[54] LOW VOLATILE ORGANIC CONTENT AUTOMOTIVE REFINISH COATING COMPOSITION

[75] Inventors: Truman F. Wilt, Clinton; Joseph M. Carney, Pittsburgh; Stephen J. Thomas, Aspinwall; James A. Claar, Mars; William J. Birkmeyer, Oakmont, all of Pa.

[73] Assignee: PPG Industries, Inc., Pittsburgh, Pa.

[21] Appl. No.: 276,366

[22] Filed: Jul. 18, 1994

[51] Int. Cl.$^6$ ............................ C08J 3/00; C08K 5/205; C08L 51/00; C08L 75/00
[52] U.S. Cl. ................... 524/539; 524/590; 528/66; 528/74.5; 528/80; 528/81; 528/84
[58] Field of Search ........................ 524/539, 590; 528/66, 74.5, 80, 81, 84

[56] References Cited

U.S. PATENT DOCUMENTS

| | | | |
|---|---|---|---|
| 4,692,382 | 9/1987 | Schmitt et al. | 428/414 |
| 5,283,311 | 2/1994 | Narayan et al. | 528/49 |
| 5,349,041 | 9/1994 | Blum et al. | 528/85 |

FOREIGN PATENT DOCUMENTS

| | | |
|---|---|---|
| 0571829A2 | 5/1993 | European Pat. Off. . |

OTHER PUBLICATIONS

Odian, *Principles of Polymerization*, 1981, pp. 28–29.
Production Bulletin: Eastman® 1,4–CHDA A Basic Coil Study, Publication No. N–327 Oct. 1989, Eastman Chemical Products Inc., Kingsport, Tenn.

*Primary Examiner*—Paul R. Michl
*Assistant Examiner*—Patrick Niland
*Attorney, Agent, or Firm*—Linda Pingitore; Dennis G. Millman

[57] ABSTRACT

An automotive refinish coating composition having a volatile organic content not exceeding 3.0 pounds per gallon contains a hydroxyl functional polyester and a polyisocyanate curing agent. The hydroxyl functional polyester is prepared from reactants containing:

A. from about 15 percent to about 50 percent of a polyol or mixture of polyols, each having a formula molecular weight from about 50 to about 2,000;
B. from about 15 percent to about 50 percent of a long chain monocarboxylic acid or mixture of such acids, each having from about 6 to 24 carbon atoms; and
C. from about 15 percent to about 30 percent of 1,4-cyclohexane dicarboxylic acid; the percentages based on the total weight of reactants used in preparing the polyester. The refinish coating composition is particularly suitable as a clear topcoat over a pigmented basecoat.

22 Claims, No Drawings

LOW VOLATILE ORGANIC CONTENT AUTOMOTIVE REFINISH COATING COMPOSITION

BACKGROUND OF THE INVENTION

The present invention relates to polyester polyol based coating compositions cured with polyisocyanates for automotive refinish applications.

One of the major goals in the coatings industry currently is the formulation of coating compositions which have not only excellent physical properties and appearance but also are formulated with minimal amounts of volatile organic solvents. This is especially true in the automotive coatings area where the so called "glamour-like" finish of the automobile is an important but difficult to achieve feature with coating compositions having minimal amounts of organic solvents. In the automotive refinish coating area, there is the further requirement that the coating composition be capable of ambient temperature cure or at most a forced heating step with a slightly elevated temperature. Automotive refinish clear coatings pose a particular challenge since not only must the appearance and volatile organic content meet certain rigid requirements but the clear coating must not yellow since this can detract from the glamour-like finish of the pigmented basecoat.

Accordingly, there is a need for a low volatile organic content automotive refinish clear coating composition which not only has excellent physical properties and appearance but meets stringent environmental requirements for volatile organic solvent emissions.

SUMMARY OF INVENTION

In accordance with the present invention there is provided an automotive refinish coating composition having a volatile organic content not exceeding 3.0 pounds per gallon, comprising:

A. a hydroxyl functional polyester prepared from reactants comprising:
  (a) from about 15 percent to about 50 percent of a polyol or mixture of polyols, each having a formula molecular weight from about 50 to about 2,000;
  (b) from about 15 percent to about 50 percent of a long chain monocarboxylic acid or mixture of monocarboxylic acids, each having from 6 to 24 carbon atoms;
  (c) from about 15 percent to about 30 percent of 1,4-cyclohexane dicarboxylic acid; the percentages based on the total weight of reactants used in preparing the polyester and
B. a polyisocyanate curing agent.

DETAILED DESCRIPTION OF THE INVENTION

The automotive refinish coating compositions of the present invention contain a hydroxyl functional polyester and a polyisocyanate curing agent. Generally stated, a hydroxyl functional polyester, also referred to as a polyester polyol, can be prepared by the polyesterification of a polyol with a carboxylic acid. Specifically, the hydroxyl functional polyester of the present invention is prepared from about 15 percent to about 50 percent of a polyol or mixture of polyols, each having a formula molecular weight ranging from about 50 to about 2,000. Preferably, the amount of polyol ranges from about 20 percent to about 45 percent and more preferably from about 30 percent to about 40 percent, the percentages based on the total weight of reactants used in preparing the polyester. Usually, the polyol is a diol or triol although polyols of higher functionality can be used. Preferably, the polyol has a formula molecular weight of from about 75 to about 1000 and more preferably from about 100 to about 300. Examples of suitable polyols include ethylene glycol, diethylene glycol, glycerol, trimethylpentane diol, cyclohexane diol, 1,6-hexanediol, trimethylolpropane, pentaerythritol, neopentyl glycol, 2-methylolpropane diol, ethoxylated trimethylolpropane and mixtures thereof.

In addition to the polyol described above, the hydroxyl functional polyester is prepared from about 15 percent to about 50 percent of a long chain monocarboxylic acid or mixture of such acids, each having from 6 to 24 carbon atoms, preferably 12 to 20 carbon atoms. Use of monocarboxylic acids having more than 24 carbons is not preferred since these materials, which tend to be soft and waxy, detract from the appearance of the cured film. Preferably the amount of long chain monocarboxylic acid ranges from about 20 percent to about 45 percent, more preferably from about 30 percent to about 40 percent, the percentages based on the total weight of reactants used in preparing the polyester. Examples of suitable long chain monocarboxylic acids include hexanoic acid, heptanoic acid, octanoic acid, nonanoic acid, decanoic acid, lauric acid, isostearic acid, stearic acid, hydroxystearic acid, linseed fatty acid, oleic acid, octadecanoic acid, tetradecanoic acid, icosane and mixtures thereof. Preferably the long chain monocarboxylic acid is isostearic acid. Also preferred is a mixture of isostearic acid and lauric acid.

A further important ingredient used in the preparation of the hydroxyl functional polyester of the present invention is 1,4-cyclohexane dicarboxylic acid. The 1,4-cyclohexane dicarboxylic acid is used in an amount from about 15 percent to about 30 percent, more preferably from about 20 percent to about 25 percent, the percentages based on the total weight of reactants used in preparing the polyester. This material can be commercially obtained from Eastman Kodak as EASTMAN® 1,4-CHDA and is sold as a mixture of isomers. Preferred for use herein is a high purity grade of the product which is approximately 80:20 cis:trans. The "R" grade which is approximately 60:40 cis:trans can also be used. The 1,4-cyclohexane dicarboxylic acid is believed important in achieving good hardness, durability, ultraviolet light stability and faster tack time in the coating film.

The reactants used in preparing the hydroxyl functional polyester can additionally contain a mono or dicarboxylic acid or anhydride thereof different from the long chain monocarboxylic acid described above. Among the carboxylic acids or anhydrides which are useful are for example, adipic acid, succinic acid, suberic acid, pimeric acid, isophthalic acid, azelaic acid, sebacic acid, maleic acid, glutaric acid, dodecanedioic acid, terephthalic acid, chlorendic acid, cyclohexane carboxylic acid, hexahydrophthalic anhydride or mixtures thereof. The mono or dicarboxylic acid or anhydride thereof, when used, generally ranges from about 0 percent to about 50 percent, the percentage based on the total weight of reactants used in preparing the polyester. The ingredients used in preparing the hydroxyl functional polyester can also include minor amounts of mono basic acids such as benzoic acid or acetic acid. Also, there can be employed minor amounts of higher polycarboxylic acids such as trimellitic acid and tricarballylic acid. Also, lower alkyl esters of such acids such as dimethyl glutarate and dimethyl terephthalate can be used.

The polyesterification reaction is carried out in accordance with the techniques well known to those skilled in the art of polymer chemistry and will not be discussed in detail here. Generally, the reaction can be conducted by combining the ingredients and heating to a temperature of about 160° C. to about 220° C., often referred to as "hot melt" conditions. It is important to note however, that the polyesterification reaction is preferably conducted under azeotropic conditions using any solvent which forms a good azeotrope with water, for example xylene or 1-decene. Preferably xylene is utilized. The amount of azeotropic solvent generally ranges from about 3 percent to about 4 percent, based on the total weight of reactants used in preparing the polyester. Xylene is typically used in an amount of about 3 percent. During the course of the polyesterification, most of the polyester is formed in a temperature range of about 170° C. to about 220° C. which is preferred because the lower temperature helps to prevent hazing of the final product. The temperature during the entire course of the reaction generally ranges from about 160° C. to about 220° C. The polyesterification is considered complete when an acid value of less than 4 mg KOH/gram of polymer is obtained as determined by well known potentiometric titration techniques.

The hydroxyl functional polyesters used in formulating the claimed automotive refinish coating compositions generally have a hydroxyl number ranging from about 100 to about 300, preferably from about 175 to about 275 and more preferably from about 200 to about 260 mg KOH/gram of polymer determined by the above-mentioned potentiometric techniques. The aforesaid hydroxyl functional polyesters generally have a number average molecular weight ranging from about 800 to about 3000, preferably from about 900 to about 1700, the molecular weight determined by gel permeation chromatography (GPC) using polystyrene as a standard.

It should be understood that 2-hydroxyethyl ethylene urea can be used in the preparation of the hydroxyl functional polyester in the same way a monocarboxylic acid would be used for its chain terminating ability. This material can be commercially obtained from Sartomer Company as HEEU.

As one skilled in the art readily appreciates, a catalyst is typically used to accelerate the polyesterification reaction. Usually butyl stannoic acid or dibutyltin oxide are used. The catalyst is optional, and if used, the amount can vary widely. When used, the amount typically ranges from about 0.1 percent to about 0.25 percent, the percentage based on the total weight of the reactants used in preparing the polyester.

The polyisocyanate which is used to cure (crosslink) the hydroxyl functional polyester can be selected from a variety of organic materials including aliphatic, cycloaliphatic as well as aromatic, polyisocyanates, including mixtures thereof. Typically, the polyisocyanate is a diisocyanate. Examples of suitable aliphatic diisocyanates include 1,4-tetramethylene diisocyanate and 1,6-hexamethylene diisocyanate. Examples of suitable aromatic diisocyanates are 4,4'-diphenylmethane diisocyanate, 1,3-phenylene diisocyanate, 1,4-phenylene diisocyanate and toluene diisocyanateo Examples of suitable cycloaliphatic diisocyanates include 1,4-cyclohexyl diisocyanate, isophorone diisocyanate, 4,4'-methylene-bis(cyclohexyl isocyanate). Triisocyanates such as TMXDI-IMP aliphatic triisocyanate available from CYTEC can also be used. Isocyanurates and biurets of the diisocyanates described above can also be used. Preferably, the polyisocyanate curing agent of the present invention is an isocyanurate. More preferably the isocyanurate is a blend of isocyanurates, especially a blend of the isocyanurate of isophorone diisocyanate (IPDI) and the isocyanurate of hexamethylene diisocyanate (HDI). The blend generally includes from about 5 percent to about 50 percent IPDI and from about 50 percent to about 95 percent HDI, preferably about 20 percent to about 80 percent IPDI and about 40 percent to about 60 percent HDI. More preferably the blend contains about 25 to about 30 percent IPDI and about 70 to about 75 percent HDI.

The amount of hydroxyl functional polyester and polyisocyanate curing agent in the claimed automotive refinish coating composition is such that the hydroxyl to isocyanate equivalent ratio ranges from about 1:0.5 to about 1:2.5, preferably from about 1:1 to about 1:2 and more preferably from about 1:1.5 to about 1:1.8. The claimed automotive refinish coating compositions are particularly advantageous in that they have a minimal amount of volatile organic solvent (VOC) which generally does not exceed 3.0 pounds per gallon, preferably does not exceed 2.5 pounds per gallon and more preferably does not exceed 2.1 pounds per gallon. The claimed coating compositions are generally multi-package coating compositions with the hydroxyl functional polyester in one package and the polyisocyanate curing agent in a separate package. Other ingredients of the composition can be included in any package as desired, preferably, the claimed coating compositions are three package compositions with the hydroxyl functional polyester in one package, the curing agent in a second package and the third package containing an accelerator to assist in speeding up the curing reaction between the hydroxyl and isocyanate groups. Examples include materials such as dibutyltin dilaurate and dibutyltin diacetate. Also preferably contained in the third package is a material to extend pot life, for example, 3-ethyl 2,4-pentanedione, pentanedione or tertiary butyl acetoacetate. The other ingredients can be in any of the packages as desired.

The claimed coating compositions typically have a resin solids content ranging from about 50 percent to about 90 percent as determined at 110° C. for one hour.

Although the claimed coating compositions are preferably clear coating compositions which can be used as a clear topcoat over a pigmented basecoat, the coating compositions can also be pigmented with a variety of pigments and utilized as a colored basecoat or topcoat, without a clearcoat. Alternatively, the claimed coating compositions can be used as primers if desired. A variety of pigments well known to those skilled in the art can be used including inorganic pigments such as titanium dioxide, silica, iron oxide, talc, mica, carbon black, and zinc oxide. Organic pigments can also be used. In addition, metallic pigments such as aluminum flake and metallic effect pigments such as the pearlescent pigments available from Mearl Corp. can be used.

The claimed coating compositions are typically prepared in a suitable solvent to facilitate formulation and application. Suitable solvents include aliphatic solvents such as VM & P NAPTHA; aromatic petroleum distillates; cycloaliphatic solvents like cyclohexane; ketones like methylethyl ketone, methylisobutyl ketone and methyl amyl ketone; alcohols such as ethyl alcohol, propyl alcohol and diacetone alcohol; acetates like butyl acetate and hexyl acetate; and mono and dialkyl ethers of ethylene, propylene and diethylene glycol such as ethylene glycol monethylether, ethylene glycol monobutyl ether, ethylene glycol monoethylether acetate, diethylene glycol diethyl ether, propylene glycol monomethyl ether, dipropylene glycol ether, and propylene glycol monomethyl ether acetate.

The claimed coating compositions can also contain a variety of conventional additives including surfactants, antioxidants, ultraviolet light absorbers, stabilizers, rheology control agents, coalescing agents and the like.

The aforedescribed packages containing the ingredients of the coating composition are typically combined together with mild agitation prior to application. The coating compositions are typically applied by spray application although other well known modes of application can be utilized. As mentioned above, the coating composition is typically applied as a clear topcoat over a pigmented basecoat, including a variety of conventionally known basecoats. The clear topcoat is generally applied at a uniform film thickness ranging from about 2 to about 3 mils. The coating compositions can be cured under ambient conditions or at slightly elevated temperatures by heating to a temperature ranging from about 30° C. to about 60° C.

The coating compositions of the present invention not only contain minimal volatile organic solvent but also exhibit excellent appearance and physical properties including gloss, hardness and distinctness of image. Further, the coatings have good tack time after application.

The following examples are illustrative of the invention and are not intended to be limiting.

EXAMPLES

The following examples illustrate the preparation of various polyesters according to the present invention, their formulation into automotive refinish coating compositions and evaluation.

Preparation of Polyesters

Examples 1 to 8 below show the preparation of a variety of hydroxyl functional polyesters according to the present invention. The following procedure was followed in preparing each polyester:

Materials (A), (B), (C), (D), (E), (F) and (G) where used, were charged into a three-liter, four-necked round bottom flask equipped with a motor driven stainless steel paddle agitator, a thermocouple to record batch temperature, a Dean-Stark water trap connected with a condenser to collect distillate evolved, and a nitrogen sparge tube.

The synthesis of Example 2 was performed using azeotropic conditions with xylene (3% on solids). Heat was applied to a Glas-Col heating mantle and the temperature was gradually increased to about 220° C. and held until an acid value of less than four was obtained.

The remaining Examples were prepared by simply combining the ingredients and gradually increasing the temperature to about 220° C. ("Hot melt" conditions).

| Charge | Reactants | Weight (Grams) | Equivalents | Weight (percent) |
|---|---|---|---|---|
| Example 1 Preparation of polyester using linseed fatty acid. | | | | |
| A | 1,4-Cyclohexane Dicarboxylic Acid | 344.0 | 4.00 | 23.6 |
| B | Linseed Fatty Acid | 575.4 | 2.00 | 39.4 |
| C | Trimethylolpropane | 540.0 | 12.0 | 37.0 |
| D | Triphenyl Phosphite | 3.70 | | |
| E | Dibutyltin Oxide | 2.50 | | |
| Example 2 Preparation of polyester using isostearic acid. | | | | |
| A | 1,4-Cyclohexane Dicarboxylic Acid | 344.0 | 4.00 | 23.7 |
| B | Isostearic Acid | 568.0 | 2.00 | 39.1 |
| C | Trimethylolpropane | 540.0 | 12.0 | 37.2 |
| D | Triphenyl phosphite | 3.60 | | |
| E | Dibutyltin Oxide | 2.60 | | |
| Example 3 Preparation of polyester using isostearic acid and cyclohexane carboxylic acid. | | | | |
| A | 1,4-Cyclohexane Dicarboxylic Acid | 344.0 | 4.00 | 26.5 |
| B | Isostearic Acid | 284.0 | 1.00 | 21.9 |
| C | Trimethylolpropane | 540.0 | 12.0 | 41.7 |
| D | Cyclohexane Carboxylic Acid | 128.2 | 1.00 | 9.89 |
| E | Triphenyl Phosphite | 3.30 | | |
| F | Dibutyltin Oxide | 2.30 | | |
| Example 4 Preparation of polyester using pentaerythritol and trimethylol propane. | | | | |
| A | 1,4-Cyclohexane Dicarboxylic Acid | 344.0 | 4.00 | 27.5 |
| B | Isostearic Acid | 568.0 | 2.00 | 45.5 |
| C | Trimethylolpropane | 275.0 | 6.11 | 22.0 |
| D | Pentaerythritol | 73.40 | 1.42 | 5.00 |
| E | Triphenyl Phosphite | 3.20 | | |
| F | Dibutyltin oxide | 2.20 | | |
| Example 5 Preparation of polyester using a mixture of isostearic acid and lauric acid. | | | | |
| A | 1,4-Cyclohexane Dicarboxylic Acid | 344.0 | 4.00 | 29.6 |
| B | Isostearic Acid | 284.0 | 1.00 | 24.4 |
| C | Trimethylolpropane | 335.3 | 7.50 | 28.8 |
| D | Lauric Acid | 200.0 | 1.00 | 17.2 |
| E | Triphenyl Phosphite | 3.00 | | |
| F | Dibutyltin Oxide | 2.10 | | |
| Example 6 Preparation of polyester using lauric acid. | | | | |
| A | 1,4-Cyclohexane Dicarboxylic Acid | 344.0 | 4.00 | 31.9 |
| B | Lauric Acid | 400.0 | 2.00 | 37.1 |
| C | Trimethylolpropane | 335.3 | 7.50 | 31.1 |
| D | Triphenyl Phosphite | 2.80 | | |
| E | Dibutyltin Oxide | 1.90 | | |

| Charge | Reactants | Weight (Grams) | Equivalents | Weight (percent) |
|---|---|---|---|---|
| \multicolumn{5}{c}{Example 7} |
| \multicolumn{5}{c}{Preparation of polyester using isostearic acid, lauric acid and cyclohexane carboxylic acid.} |
| A | 1,4-Cyclohexane Dicarboxylic Acid | 344.0 | 4.00 | 25.9 |
| B | Isostearic Acid | 284.0 | 1.00 | 21.4 |
| C | Trimethylolpropane | 536.4 | 12.0 | 40.4 |
| D | Lauric Acid | 100.0 | 0.50 | 7.53 |
| E | Cyclohexane Carboxylic Acid | 64.1 | 0.50 | 4.82 |
| F | Triphenyl Phosphite | 3.50 | | |
| G | Dibutyltin oxide | 2.40 | | |
| \multicolumn{5}{c}{Example 8} |
| \multicolumn{5}{c}{Preparation of polyester using ethoxylated trimethylolpropane.} |
| A | 1,4-Cyclohexane Dicarboxylic Acid | 191.0 | 2.22 | 17.4 |
| B | TP-30* | 593.3 | 6.67 | 53.9 |
| C | Isostearic Acid | 315.5 | 1.11 | 28.7 |
| D | Triphenyl Phosphite | 2.70 | | |
| E | Dibutyltin oxide | 2.00 | | |

*Ethoxylated trimethylolpropane commercially available from Perstorp AB.

Preparation of Clear Coating Compositions

The following Examples 9 to 11 illustrate the preparation and evaluation of clear coating compositions with the hydroxyl functional polyesters of Examples 1 to 8, above.

The ingredients used in the coating formulations are explained in the table immediately following the formulations.

Each of the coating compositions had a theoretical VOC of about 2.1.

| Ingredients | Weight Percent |
|---|---|
| \multicolumn{2}{c}{Example 9} |
| Polyol Package | |
| Polyester of Example 2 | 31.50 |
| TEGO 425 | 0.30 |
| EKTASOLVE EEP | 7.07 |
| TINUVIN 384 | 1.83 |
| Dibutyltin Dilaurate | 0.04 |
| Sub Total | 40.74 |
| Hardener Package | |
| DESMODUR N 3400 | 33.66 |
| T-1890 | 16.02 |
| Methyl Amyl Ketone | 3.80 |
| Sub Total | 53.48 |
| Additive Package | |
| Dibutyltin Dilaurate | 0.08 |
| Pentanedione | 5.70 |
| Sub Total | 5.78 |
| TOTAL | 100.00 |
| \multicolumn{2}{c}{Example 10} |
| Polyol Package | |
| Polyester of Example 6 | 27.45 |
| SILWET 7500 | 0.69 |
| DOWANOL PMA | 9.15 |
| Methyl Amyl Ketone | 6.53 |
| EXXATE 600 | 2.99 |
| SOLVESSO 100 | 1.87 |
| TINUVIN 384 | 1.65 |
| Dibutyltin Dilaurate | 0.70 |
| Pentanedione | 3.97 |
| Sub Total | 54.39 |
| Hardener Package | |
| DESMODUR N 3400 | 30.90 |
| T-1890 | 14.72 |
| Sub Total | 45.62 |
| TOTAL | 100.00 |
| \multicolumn{2}{c}{Example 11} |
| Polyol Package | |
| Polyester of Example 8 | 27.47 |
| SILWET 7500 | 0.69 |
| DOWANOL PMA | 9.15 |
| Methyl Amyl Ketone | 6.53 |
| EXXATE 600 | 2.99 |
| SOLVESSO 100 | 1.87 |
| TINUVIN 384 | 1.65 |
| Dibutyltin Dilaurate | 0.07 |
| Pentanedione | 3.97 |
| Sub Total | 54.39 |
| Hardener Package | |
| DESMODUR N 3400 | 30.90 |
| T-1890 | 14.72 |
| Sub Total | 45.62 |
| TOTAL | 100.00 |

Explanation of ingredients:

| | |
|---|---|
| Steel Panels | Commercially obtained from Advanced Coating Technologies, Inc. Hillsdale, MI as ACT cold roll steel B952 DIW: polish. |
| DP 40/DP401 | A sealer made by mixing 1 volume DP 40 epoxy primer/1 volume DP 401 epoxy primer catalyst. All products commercially available from PPG Industries, Inc. PPG Finishes. |
| DBU16642/DRR1170 | A basecoat made by mixing DBU16642 Deltron ® basecoat and 1.5 volume DRR 1170 reactive reducer. All products commercially available from PPG Industries, Inc. PPG Finishes. |
| TINUVIN ® 384 | UV absorber commercially available from Ciba-Geigy Corporation, Hawthorne, New York. |
| EKTASOLVE ® EEP | Solvent commercially available from Eastman Chemical Products, Kingston, TN. |
| Methyl Amyl Ketone | Solvent commercially available from Union Carbide Chemical and Plastics Corporation, Danbury, CT. |
| DOWANOL ® PM | Solvent commercially available from |

| Ingredients | Weight Percent |
| --- | --- |
| acetate | Eastman Chemical Products, Kingston, TN. |
| TEGO 425 | A surfactant commercially available from TEGO Chemie Service USA, a Division of Goldschmidt Chemical Corp., Hopewell, VA. |
| Dibutyltin Dilaurate | A catalyst commercially available from ATOCHEM North America, Philadelphia, PA. |
| DESMODUR ® N 3400 | A polyisocyanate commercially available from Miles Inc., Pittsburgh, PA which is the isocyanurate of hexamethylene diisocyanate. |
| T-1890 | A polyisocyanate commercially available from Hüls Chemische Werk Hüls AG, Marl, Germany which is the isocyanurate of isophorone diisocyanate. |
| Pentanedione | Solvent and pot life extender available from Union Carbide Chemical and Plastics Corporation, Danbury, CT. |
| SILWET ® 7500 | Surfactant commercially available from Union Carbide Chemical and Plastics Corporation, Danbury, CT. |
| SOLVESSO ® 100 | Solvent commercially available from Exxon Chemical Co., Houston, TX. |
| EXXATE ® 600 | Solvent commercially available from Exxon Chemical Co., Houston, TX. |

Coatings were applied over thirty-two gauge steel panels pretreated with zinc phosphate. The panels were primed with DP40/DP401, allowed to dry for one hour followed by application of a basecoat DBU- 16442/DRR-1170. The basecoat was allowed to dry for 30 minutes then the clear coat was applied. Each of the coated panels was allowed to dry overnight at room temperature before testing.

Test Methods

20° GLOSS was measured with a Byk Gardner Glossgard IIa gloss meter. SWARD HARDNESS was measured using a Sward Rocker. PENCIL HARDNESS was measured using Eagle-Tortoise pencils. Pencil Hardness was a measure of the resistance of the coating to a pencil indentor. The hardness scale ranges from 4B, which indicates a relatively soft coating, and increasing to 10H, which indicates a relatively hard coating.

TACK TIME was measured by determining the time in minutes (hours) from when the coating was first applied to the time when the coating no longer felt sticky when a light pressure of the forefinger was applied to the coating surface.

| | Properties | | | |
| --- | --- | --- | --- | --- |
| Example | Tack Time (hrs.) | 20° Gloss | Sward Hardness (24 hrs.) | Pencil Hardness (24 hrs.) |
| 9 | 2.0 | 87 | 12 | 6B |
| 10 | 2.5 | 85 | 6 | 5B |
| 11 | 2.75 | 87 | 2 | 6B |

What is claimed is:

1. An automotive refinish coating composition having a volatile organic content not exceeding 3.0 pounds per gallon comprising:
   A. a hydroxyl functional polyester having an acid value less than 4 mg KOH per gram of polyester polymer, prepared from reactants comprising:
      a) from about 15 percent to about 50 percent of a polyol or mixture of polyols, each having a formula molecular weight from about 50 to about 2000;
      b) from about 15 percent to about 50 percent of a long chain monocarboxylic acid or mixture of monocarboxylic acids, each having from 6 to 24 carbon atoms;
      c) from about 15 percent to about 30 percent of 1,4-cyclohexane dicarboxylic acid; the percentages based on the total weight of reactants used in preparing the polyester; and
   B. a polyisocyanate curing agent.

2. The coating composition of claim 1 wherein component A additionally comprises a mono- or dicarboxylic acid or anhydride thereof different from the long chain monocarboxylic acid of component (b).

3. The coating composition of claim 1 wherein the polyol is selected from the group consisting of ethylene glycol, diethylene glycol, glycerol, trimethylpentane diol, cyclohexane diol 1,6-hexanediol, trimethylolpropane, ditrimethylol propane, neopentyl glycol, 2-methylol propane diol, pentaerythritol, ethoxylated trimethylol propane and mixtures thereof.

4. The coating composition of claim 3 wherein the polyol is trimethylolpropane.

5. The coating composition of claim 1 wherein the amount of polyol ranges from about 20 percent to about 45 percent.

6. The coating composition of claim 5 wherein the amount of polyol ranges from about 30 percent to about 40 percent.

7. The coating composition of claim 1 wherein the long chain monocarboxylic acid is selected from the group consisting of stearic acid, isostearic acid, hydroxystearic acid, lauric acid, linseed fatty acid, and mixtures thereof.

8. The coating composition of claim 7 wherein the long chain monocarboxylic acid is a mixture of isostearic acid and lauric acid.

9. The coating composition of claim 7 wherein the long chain monocarboxylic acid is isostearic acid.

10. The coating composition of claim 1 wherein the amount of long chain monocarboxylic acid ranges from about 20 percent to about 45 percent, 11. The coating composition of claim 10 wherein the amount of long chain monocarboxylic acid ranges from about 30 percent to about 40 percent.

12. The coating composition of claim 1 wherein the amount of 1,4-cyclohexane dicarboxylic acid ranges from about 20 percent to about 25 percent.

13. The coating composition of claim 1 wherein the polyisocyanate is an isocyanurate or blend of isocyanurates.

14. The coating composition of claim 13 wherein the isocyanurate is a blend of the isocyanurate of isophorone diisocyanate and the isocyanurate of hexamethylene diisocyanate.

15. The coating composition of claim 1 wherein the volatile organic content does not exceed 2.5 pounds per gallon.

16. The coating composition of claim 1 wherein the hydroxyl functional polyester has a hydroxyl number ranging from about 100 to about 300 mg KOH/gram of polymer.

17. The coating composition of claim 1 wherein the hydroxyl functional polyester has a number average molecular weight of from about 800 to about 3000.

18. The coating composition of claim 1 wherein the equivalent ratio of hydroxyl groups in the polyester polyol to isocyanate groups in the polyisocyanate ranges from about 1:0.5 to about 1:2.5.

19. The coating composition of claim 2 wherein the amount of mono- or dicarboxylic acid or anhydride thereof different from the long chain monocarboxylic acid ranges from about 0 percent to about 50 percent.

20. The coating composition of claim 1 which is a pigmented coating composition.

21. The coating composition of claim 1 which is a clear coating composition,

22. The coating composition of claim 1 wherein the hydroxyl functional polyester has a number average molecular less than 1700.

* * * * *